US009658118B2

(12) United States Patent
Charles et al.

(10) Patent No.: US 9,658,118 B2
(45) Date of Patent: May 23, 2017

(54) PRECISION TEMPERATURE MEASUREMENT DEVICES, SENSORS, AND METHODS

(71) Applicant: LINEAR TECHNOLOGY CORPORATION, Milpitas, CA (US)

(72) Inventors: Gordon Alexander Charles, Sunnyvale, CA (US); Mark Alan Lemkin, Berkeley, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 512 days.

(21) Appl. No.: 14/080,625

(22) Filed: Nov. 14, 2013

(65) Prior Publication Data

US 2014/0140364 A1 May 22, 2014

Related U.S. Application Data

(60) Provisional application No. 61/727,317, filed on Nov. 16, 2012.

(51) Int. Cl.
*G01K 15/00* (2006.01)
*G01K 7/01* (2006.01)

(52) U.S. Cl.
CPC ............ *G01K 15/005* (2013.01); *G01K 7/01* (2013.01)

(58) Field of Classification Search
CPC .................. G01K 15/005; G01K 7/01
(Continued)

(56) References Cited

U.S. PATENT DOCUMENTS 7,484,886 B2 * 2/2009 Clark, Jr. ............... G01K 7/015
  374/141
2008/0317086 A1 * 12/2008 Santos ..................... G01K 7/00
  374/1

(Continued)

FOREIGN PATENT DOCUMENTS

TW          476997 B    2/2002

OTHER PUBLICATIONS

K. A. A. Makinwa and J. F. Witte, "A temperature sensor based on a thermal oscillator," Sensors, 2005 IEEE, Irvine, CA, 2005, pp. 4.*

(Continued)

*Primary Examiner* — Lisa Caputo
*Assistant Examiner* — Nathaniel T Woodward
(74) *Attorney, Agent, or Firm* — McDermott Will & Emery LLP

(57) ABSTRACT

A precision temperature sensing system includes a heater and a sensing element disposed on a semiconductor substrate. A power source drives the heater on a periodic basis according to a received clock signal. The sensing element senses the heat emitted by the heater and diffused through the semiconductor substrate. Processing circuitry coupled to the sensing element adjusts a phase of the periodic heater driving signal based on the heat sensed by the sensing element. The processing circuitry determines a temperature based on a thermal diffusivity (TD) of the semiconductor substrate, the adjusted value of the phase, and a known distance between the heater and the sensing element. A second temperature sensor can be disposed on the same substrate as the precision temperature sensing system, and calibrated based on temperature measurements obtained while applying a reference frequency signal to the precision sensing system.

15 Claims, 13 Drawing Sheets

(58) Field of Classification Search
USPC .......................................................... 374/1
See application file for complete search history.

(56) References Cited

U.S. PATENT DOCUMENTS

2011/0187428 A1* 8/2011 Kashmiri ................ H03L 1/022
327/159
2011/0227199 A1 9/2011 Hata et al.

OTHER PUBLICATIONS

C. Zhang et al., "The Effect of Substrate Doping on the Behaviour of a CMOS Electrothermal Frequency-Locked-Loop," qjTransducers & Eurosensors '07; The 14th International Conference on Solid-State Sensors, Actuators and Microsystems, Lyon, France, Jun. 10-14, 2007; IEEE 2007.

J. Altet, et al., "Thermal Coupling in Integrated Circuits: Application to Thermal Testing," IEEE Journal of Solid-State Circuits, vol. 36, No. 1, Jan. 2001.

K. Souri et al., "A CMOS Temperature Sensor with a Voltage-Calibrated Inaccuracy of ±0.15° C (3o) From -55 to 125° C," ISSCC 2012 / Session 11 / Sensors & MEMS / 11.7; 2012 IEEE International Solid-State Circuits Conference.

English translation of Taiwansese Office Action dated Jul. 3, 2015, issued in corresponding Taiwanese Patent Application No. 102141726. 4 pgs.

* cited by examiner

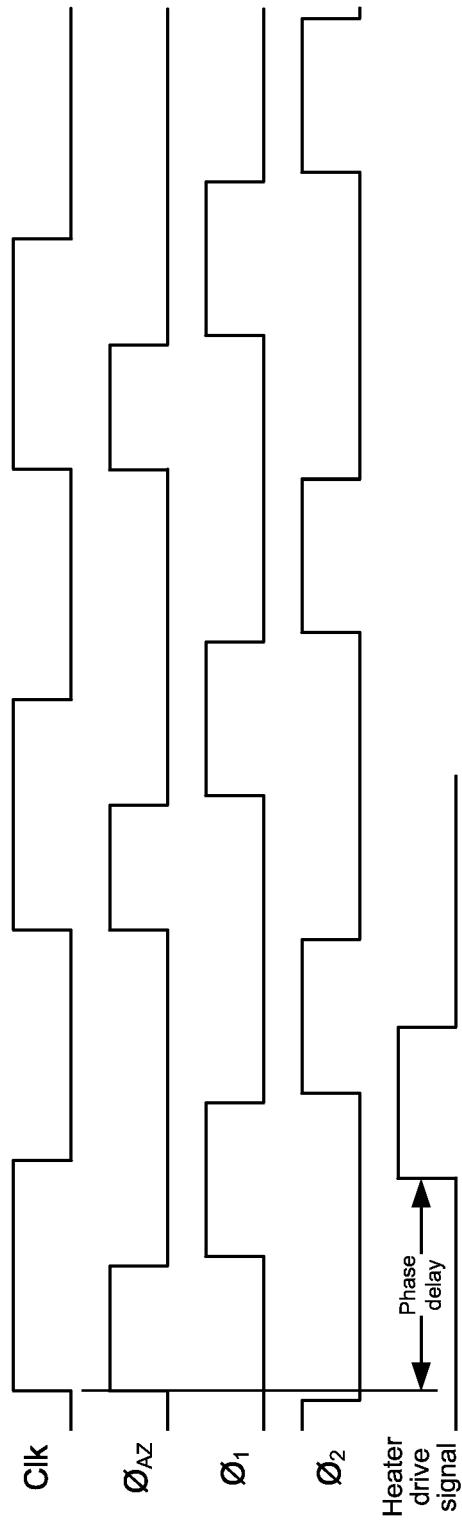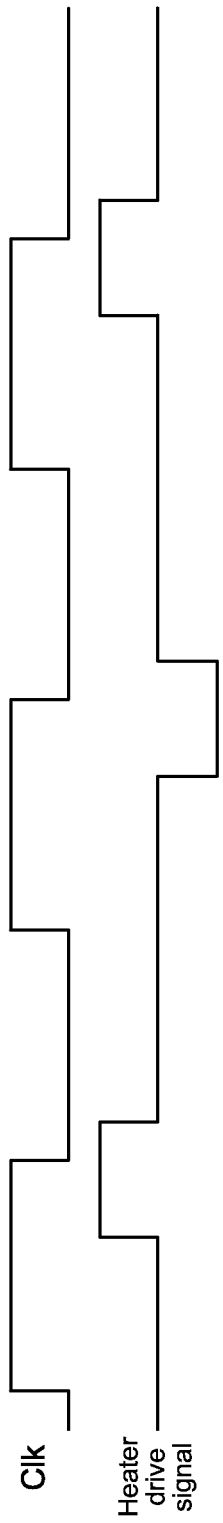
FIG. 9
FIG. 12

PRECISION TEMPERATURE MEASUREMENT DEVICES, SENSORS, AND METHODS

CROSS-REFERENCE TO RELATED APPLICATION

This application claims the benefit of U.S. Provisional Application No. 61/727,317, filed on Nov. 16, 2012, the disclosure of which is incorporated herein in its entirety.

BACKGROUND

Conventional silicon-based temperature sensors use the relationship between current, voltage, and temperature to detect or infer ambient temperature. Silicon-based temperature sensors include temperature sensors based on a base-emitter voltage ($V_{BE}$) or change in base-emitter voltage (delta $V_{BE}$) across a bipolar transistor, a voltage across or current flowing through a diode, a change in resistance of a resistor, or the change in a voltage or current across a MOSFET transistor.

Process variation, mismatch, and package-induced stress result in offset and/or scale factor errors in these conventional sensors. Furthermore, many applications require a digital temperature measurement and the temperature sensor output is often an analog quantity. The analog temperature must therefore be converted into a digital signal via an analog-to-digital converter (ADC) in conjunction with a voltage reference. Variations in the scale factor and offset of the ADC as well as in the voltage reference cause errors in the digital output signal.

Calibration of silicon-based temperature sensors at a time of manufacture may be used to improve the accuracy of the temperature sensors. However, it is difficult to apply controlled, accurate temperatures to the device under test (DUT) because thermal systems are intrinsically distributed systems that are hard to isolate from the surrounding environment. Thus, conventional temperature sensors are limited in their achievable accuracy.

Wafer-probe systems are relatively well-suited for applying a temperature to the DUT due to the comparatively large and uniform thermal mass of the chuck (which is isolated from the environment on all sides by air) and the thin layer of silicon. However, calibration before packaging is of only limited use because the packaging process can cause a shift in the temperature characteristics of the DUT. Attaining an accurate temperature calibration at final test following packaging is a quixotic effort due to thermal diffusion paths through the work press, socket pins to the loadboard, and loadboard to the tester head and environment. In practice it is difficult to maintain absolute temperature accuracy of one degree Celsius or less in a manufacturing environment at room temperature. Accurate application of a temperature, whether hot or cold (e.g. for multi-point temperature calibration), is even harder due to the thermal gradients caused by conduction paths to ambient.

Furthermore, in applications where heat is generated on the same piece of silicon as the temperature sensor, a further source of error exists due to thermal resistivity between the location where the heat is generated, through the package and socket, and the location of the heat sink (e.g. tester head).

SUMMARY

The teachings herein alleviate one or more of the above noted problems with providing devices, sensors, and methods configured for precision temperature measurement.

In a first embodiment, a method for calibrating a first temperature sensor disposed on a substrate includes steps for providing a second temperature sensor on the substrate having the first temperature sensor disposed thereon, wherein the second temperature sensor is operative to perform temperature measurements based on thermal diffusivity (TD); obtaining a first temperature measurement using the first temperature sensor; substantially concurrently with the obtaining of the first temperature measurement, applying a reference frequency signal to the second temperature sensor and obtaining a second temperature measurement using the second temperature sensor; computing a calibration adjustment value for the first temperature sensor based on the first and second temperature measurements; and adjusting a third temperature measurement from the first temperature sensor based on the computed calibration adjustment value.

The method can further include applying heat or cold to the substrate, and obtaining a fourth temperature measurement using the first temperature sensor during or following the applying of the heat or cold; and substantially concurrently with the obtaining of the fourth temperature measurement, applying the reference frequency signal to the second temperature sensor and obtaining a fifth temperature measurement using the second temperature sensor, wherein the calibration adjustment value for the first temperature sensor is computed based on the first, second, fourth, and fifth temperature measurements.

The applying of the heat or cold to the substrate can include providing power to a heater disposed on the substrate having the first and second temperature sensors disposed thereon.

The method can further include storing the computed calibration adjustment value in a non-volatile memory disposed on the substrate, for example by trimming a circuit element of the first temperature sensor disposed on the substrate to adjust a size of the circuit element.

The method can further include monitoring the reference frequency signal applied to the second temperature sensor to obtain a reference frequency signal correction value, wherein the calibration adjustment value for the first temperature sensor is computed based on the first and second temperature measurements and the obtained reference frequency signal correction value.

The applying of the reference frequency signal to the second temperature sensor can include activating an oscillator disposed on the substrate. The applying the reference frequency signal to the second temperature sensor can alternatively include receiving the reference frequency signal from an oscillator external to the substrate.

In a second embodiment, a temperature sensing system disposed on a semiconductor substrate includes: a heater disposed on the semiconductor substrate, and operative to emit heat through the semiconductor substrate in response to a driving signal; a power source receiving a clock signal, and operative to produce the driving signal used to drive the heater on a periodic basis according to the received clock signal; a sensing element disposed on the semiconductor substrate, and operative to sense the heat emitted by the heater through the semiconductor substrate; and processing circuitry coupled to the sensing element and to the power source, and operative to adjust a phase of the periodic driving signal driving the heater based on heat sensed by the sensing element.

The processing circuitry can determine the temperature based on a thermal diffusivity of the semiconductor substrate and an adjusted value of the phase. In some embodiments the processing circuitry can determine the temperature based on an adjusted value of the driving signal phase in conjunction with experimental characterization of typical units temperature-versus-phase relationship.

The sensing element can be disposed a known distance from the heater on the semiconductor substrate, and the processing circuitry can determine the temperature based on the thermal diffusivity of the semiconductor substrate, the known distance between the heater and the sensing element, and the adjusted value of the phase.

The sensing element can include a current source producing a current, and a series interconnection of diodes having the current produced by the current source flowing therethrough.

The processing circuitry can include: a transconductor coupled to output nodes of the sensing element, and operative to produce a current signal based on a voltage between the output nodes of the sensing element; an integrator coupled to the transconductor, and operative to produce an integration signal based on the current signal produced by the transconductor; and a quantizer coupled to the integrator, and operative to produce a quantization signal based on the integration signal produced by the integrator, wherein the processing circuitry adjusts the phase of the periodic driving signal based on the quantization signal produced by the quantizer.

The processing circuitry can perform one of increasing or decreasing the phase of the periodic driving signal upon determining that the integration signal is greater than a threshold, and can perform another of increasing or decreasing the phase of the periodic signal upon determining that the integration signal is smaller than the threshold.

The driving signal used to drive the heater on a periodic basis can have a polarity that alternates in successive periods of the received clock signal.

In a further embodiment, a method for measuring a temperature using a temperature sensing system disposed on a semiconductor substrate includes steps for: providing a heater disposed on the semiconductor substrate; driving the heater with a periodic signal to cause the heater to emit heat through the semiconductor substrate; sensing heat emitted by the heater through the semiconductor substrate using a sensing element; adjusting a phase of the periodic signal driving the heater based on heat sensed by the sensing element; and determining the temperature based on an adjusted value of the phase applied to the periodic signal driving the heater.

The determining the temperature can include determining the temperature based on the adjusted value of the phase applied to the periodic signal driving the heater, a thermal diffusivity of the semiconductor substrate, and a known distance between the heater and the sensing element. In some embodiments the processing circuitry can determine the temperature based on an adjusted value of the driving signal phase in conjunction with experimental characterization of typical units temperature-versus-phase relationship.

The sensing heat emitted by the heater can include: applying a current to a series interconnection of diodes, wherein the sensing element includes the series interconnection of diodes; and sensing a change in voltage across the series interconnection of diodes resulting from the heat emitted by the heater through the semiconductor substrate.

The adjusting the phase of the periodic signal can include: producing a current signal based on the change in voltage across the series interconnection of diodes; integrating the current signal over a period of time; quantizing the integrated current signal; and selectively increasing or decreasing the phase of the periodic signal driving the heater based on the quantized integrated current signal.

The driving the heater with a periodic signal can include driving the heater with a signal that alternates polarity of current flow through the heater in successive periods of the signal.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 9 and 12 are signal timing diagrams associated with a temperature sensing system such as the system of FIG. 5.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In a first embodiment, multiple temperature sensors are included in a single integrated circuit, and measurements from the various sensors are used to calibrate the sensors. In general, the multiple temperature sensors rely on different operating principles for sensing temperature, and a measurement value from a first sensor operating on a first principle is used to calibrate a second sensor operating on a second principle. The sensors are generally commonly fabricated on a same integrated circuit substrate (e.g., a same piece of silicon) or, in some examples, included within a same integrated circuit package.

The integrated circuit can include at least one sensor, among the multiple temperature sensors, that performs temperature measurements based on the Thermal-Diffusivity (TD) of silicon. The thermal diffusivity of silicon is a material property like a melting point or a band gap, and a thermal-diffusivity (TD) vs. temperature characteristic for bulk silicon has been established. TD temperature sensors operate by measuring the time for a small heat pulse (~1 mW, temperature amplitude ~0.1° C., duration from ~1 us to ~10 us) to propagate a known distance (~10 um) in silicon. The TD of silicon as a function of temperature is well-controlled and known for IC-grade silicon. Furthermore, the TD is independent of doping levels and package stress, making TD an ideal means of detecting temperature precisely without needing to calibrate each part. Unfortunately, to date all TD-based temperature sensors require a high precision frequency source, generally provided from a crystal oscillator. Furthermore, published TD-based temperature sensors require a substantial amount of time (~100 ms) and of energy to acquire the precision temperature of which they are capable.

Figure 1:
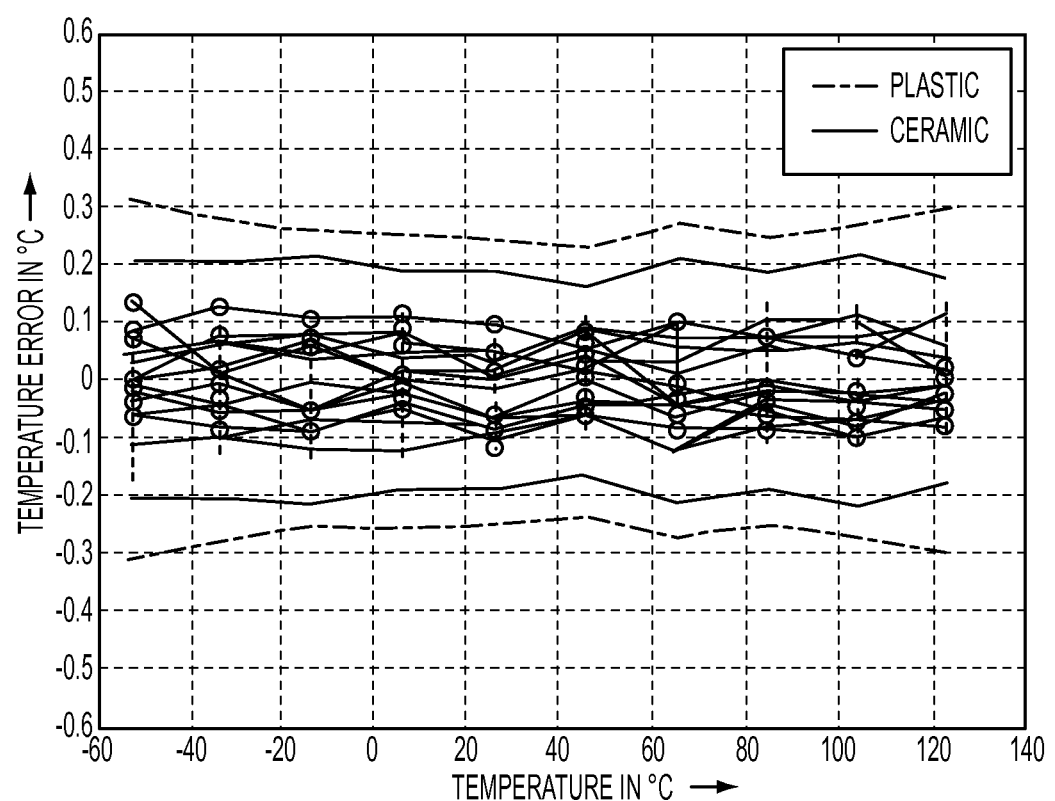
FIG. 1 is a plot showing variation in temperature error between parts packaged in ceramic and plastic packages.

FIG. 1 shows the variations between TD-based temperature sensors as the package type is varied: 8 parts packaged in a ceramic package vs. 8 parts packaged in a plastic package. In particular, FIG. 1 shows the measured untrimmed temperature error for 16 devices from a single batch, with the thicker lines (identified as "plastic" and "ceramic" in the legend) indicate the ±3σ limits for devices packaged in plastic and ceramic packages. Variation due to plastic packaging was only 0.1° C. greater (3 sigma) than ceramic packages. The variation in sensor output as the doping level changes from p-well to n-well is negligible; thus TD-based temperature sensors are substantially insensitive to doping variations.

This consistency and insensitivity to doping and stress of IC-grade silicon makes TD an ideal mechanism to detect temperature precisely without needing to calibrate every part. In some examples, an uncalibrated TD-sensor can have an accuracy of 0.2° C. (3 sigma), with the limiting factor for precision being photolithographic alignment of the heater element and the sensing element. Variation in photo-alignment causes the distance between the sensor and heating elements to vary thereby causing an error term in the measured propagation time.

According to the first embodiment, multiple temperature sensors are included in a single integrated circuit and at least one of the sensors is used to calibrate another sensor on the integrated circuit. In one example, a system 200 shown in FIG. 2 for automatically calibrating the temperature sensors is provided. In the system 200, a TD-based temperature sensor 205 is integrated with at least one other temperature sensor 203 that uses a different operating principle (i.e., an operating principle other than a TD-based operating principle, such as a sensor relying on sensing a base-emitter voltage ($V_{BE}$), a change in base-emitter voltage (delta $V_{BE}$), a change in resistance of a resistor, and/or a change in voltage or current in a MOSFET transistor or a diode, to estimate temperature) on the same substrate 201 or piece of silicon. A relationship between the temperature characteristics of the two temperature sensors is measured and/or established. By relating the sensor characteristic of the TD-based temperature sensor 205 to the sensor characteristic of the other temperature sensor 203 (e.g., calibrating the inaccurate temperature sensor 203 to the accurate or precise TD-sensor 205), one or more correction factor(s) or calibration parameter(s) 207 may be determined for each of the at least one other temperature sensor(s) 203. The calibration parameter(s) 207 can be used to improve the accuracy of the other temperature sensor 203 without the use of onerous calibration fixtures or techniques.

Furthermore, the locating of the TD-based temperature sensor 205 proximate the temperature sensor 203 diminishes the effect of package thermal resistance on the calibration by reducing the associated temperature difference between the junction temperature $T_J$ and the ambient temperature $T_{Ambient}$ outside of the package. This is particularly beneficial when a chip draws substantial power (e.g., when circuitry on the chip causes the junction temperature $T_J$ of the chip to be much higher than an ambient temperature: $T_J!=T_{Ambient}$), or when test time is small enough so that the temperature of the junction is not allocated sufficient time to settle to a known temperature.

In some industries, such as the automotive industry, market demands dictate defect rates lower than 1 part in a million. In such situations, a second TD-based temperature sensor can be provided on the substrate 201. The second TD-based temperature sensor provides the ability to calibrate the other temperature sensor 203 in case the first TD-based temperature sensor 205 fails due to fabrication defects or other errors. In one example, a TD-based temperature sensor with an area of 0.09 mm$^2$ in a 65 nm CMOS process would have a defect rate of approximately 250 in 1,000,000 parts. By comparing the measurements of the first TD-based temperature sensor 205 with the measurements of a second TD-based temperature sensor on the same substrate 201, the defect rate can be reduced to no more than 62 in 1,000,000,000 parts. Furthermore, simultaneously performing measurements using the first and second TD-based temperature sensors and averaging the measurement results from the two TD-based temperature sensors will further improve the quality of the calibration by reducing the device to device variation. Note that if the temperature measurements obtained by the first and second TD-based temperature sensors do not agree (e.g., the measurements differ by greater than a manufacturing threshold set by the statistical variation of a population of TD-based sensors, e.g. 0.5° C. or more), an error is determined and the device is classified as defective.

Figure 2:
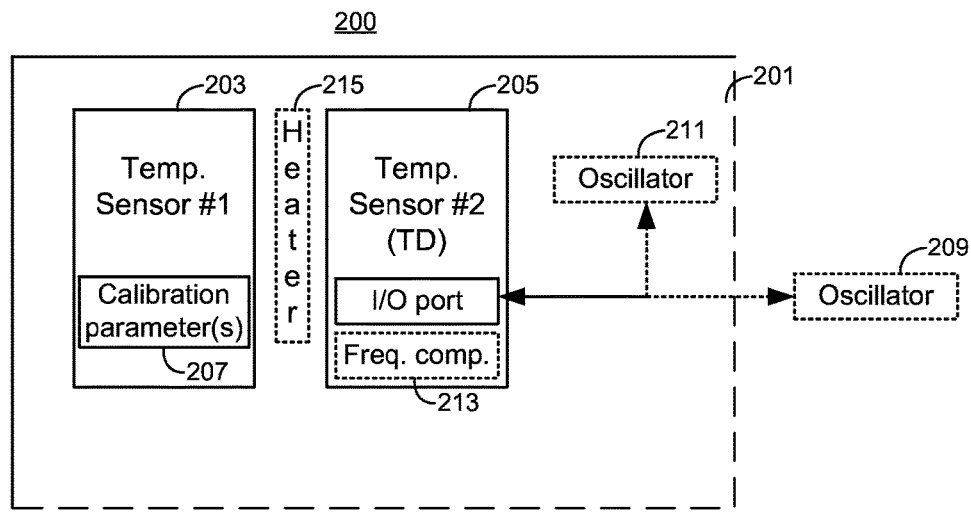
FIG. 2 is a block diagram showing elements of an illustrative system for automatically calibrating temperature sensors.
Figure 3:
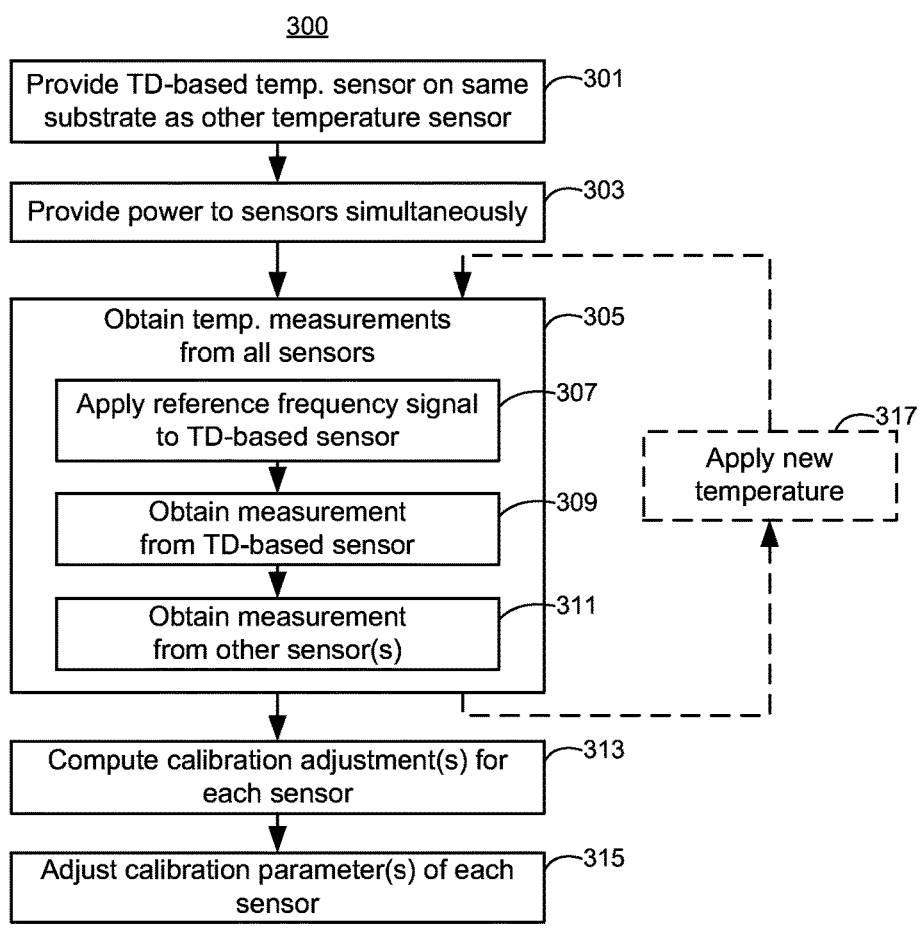
FIG. 3 is flow diagram showing steps of an illustrative method for automatically calibrating temperature sensors of the system of FIG. 2.

A method 300 of operating the system 200 of FIG. 2 is described in relation to the flow diagram of FIG. 3. In the diagram 300, a TD-sensor 205 is provided or integrated in a same/single device as at least one other temperature sensor 203 in step 301. In particular, both sensors 203 and 205 are fabricated on a single/same silicon substrate 201, and the sensor(s) 203 rely on a different operating principle than the TD-based operating principle of the sensor 205 to measure a temperature. In general, the TD-based temperature sensor 205 and the temperature sensor(s) 203 are located so as to be proximate to each other on the substrate 201. At a time of manufacture or at another appropriate time in step 303, power is applied to the device (i.e., the device under test (DUT) including the substrate 201) and both the TD-based sensor 205 and the temperature sensor(s) 203 are activated. Temperature measurements are then obtained from each of the sensors 203 and 205 in step 305. During the measurement process, a known reference frequency signal is applied to a port of the DUT in step 307, thereby providing the time reference required to determine the delay in the TD-based sensor 205. The known reference frequency signal may be applied via a tester resource (e.g., from an oscillator 209 external to the substrate 201 and external to the DUT), a crystal oscillator 211 on a loadboard coupled to the DUT during testing, a quartz crystal or other resonant element located on the loadboard, or any other appropriate frequency source. In some embodiments, a relatively inaccurate frequency source (e.g., a frequency source having variations in frequency of as much as or more than 1%) is used to measure the TD delay, and the frequency error associated with the inaccurate frequency source is monitored by a frequency compensation circuit 213 (e.g., a frequency counter) so as to be compensated using a measurement of the frequency compensation circuit 213 or the like. While the reference frequency signal is applied to the sensor 205, a temperature measurement is obtained from the TD-based sensor 205 in step 309. Substantially concurrently with the obtaining of the temperature measurement in step 309, a temperature measurement is obtained from the other sensor(s) 203 in step 311. The measurements are substantially concurrent if a time interval between the two temperature measurements is less than less the amount of time over which the temperature of the substrate 201 can change by more than a desired calibration resolution. In some examples, the time interval is 0.5 seconds. For purposes of calibration of the other temperature sensor(s) 203, the TD sensor output is taken as the "true" temperature due to its low variability from part-to-part. This "true" temperature is used in step 313 to compute an adjustment to the conventional sensor (e.g., a calibration adjustment, calibration offset, or the like). The adjustment can further be computed based on a frequency error or frequency signal correction value measured by the compensation circuit 213. The adjustment is stored as one or more calibration parameter(s) 207 on the DUT or substrate 201 in a nonvolatile memory, a fuse, a laser trim of a thin film resistor, or any other appropriate storage mechanism. The calibration parameter(s) 207 can thus be used to adjust future temperature measurements obtained from the temperature sensor(s) 203 based on the computed calibration adjustment value in step 313.

Note that in general, the actual temperature of the DUT during trim is immaterial because the TD-based sensor 205 and the other sensor(s) 203 are located in close proximity to each other and have very similar temperatures due to this proximity. Furthermore, if a TD-based sensor 205 and sensor(s) 203 provide quick temperature measurements (e.g., much faster than the thermal time constant of the package), then the temperature of the DUT does not have to be constant in order to nonetheless obtain an accurate calibration.

In some embodiments, two or more different temperatures are applied to the DUT as part of the calibration procedure, as shown in step 317. In such embodiments, the outputs of each of the temperature sensors 203, 205 at each of the two or more temperatures are used to determine and store calibration adjustment values that can include an offset as well as a scale factor term. Such use of two or more calibration parameter values can provide improved accuracy for the sensor(s) 203.

In some embodiments, a DUT is preheated to a first temperature in a tray prior to performing the calibration, and is inserted into a test socket via a heated work press. A loadboard electrically connected to the DUT for testing the DUT is at a second temperature which may be an ambient temperature. Multi-point calibration may be obtained by sampling the temperature of the TD and other sensors 205, 203 numerous times as the DUT temperature gradually transitions from the first temperature towards the second temperature. In some embodiments, the thermal transition time period taken for the DUT to transition from the first temperature towards the second temperature is much longer than the time required to acquire a sample, and multiple samples can thus be obtained during the thermal transition time period. The adjustment value and calibration parameter(s) 207 are then computed based on the multiple samples obtained.

In some embodiments, two or more different temperatures are applied to the DUT using a heater 215 or cooling system that is integrated on the substrate 201. For example, a first set of calibration measurements is taken while the DUT is at room temperature. Next, the heater 215 on the DUT is energized. The heater 215 may include a diffusion resistor, a polysilicon resistor, a transistor, or any other heat producing element. The heater 215 is located approximately equidistant to the TD-based and other temperature sensors 205 and 203, such that the effect of the heater 215 on the temperature of each of the sensors is similar. The temperature rise caused by the heater 215 can generally be substantially higher than the temperature rise used to sense the TD of silicon and may be 10° C. or more. Second (and, optionally, additional) sets of calibration measurements can be taken while the heater is energized, and/or when the system 200 reaches a new temperature following the energizing of the heater. For multi-point calibration, multiple energy levels may be applied to the on-chip heater to attain multiple temperature calibration points. Incorporation of a heater is beneficial since multi-point calibration can readily be performed on the DUT during a single test insertion or session. In the multi-point calibration, the adjustment and calibration parameter(s) 207 are calculated based on the first and second (and, optionally, additional) sets of calibration measurements.

Once each sensor 203 has been calibrated, the accuracy of each sensor 203 is similar to the accuracy of the TD-based sensor 205. The temperature sensor(s) 203, however, can advantageously be operated without a precision frequency source (e.g., quartz crystal). Additionally, the sensor(s) 203 generally have a shorter acquisition time and lower energy requirements for obtaining a temperature measurement as compared to a TD sensor 205. Further, the calibration of the sensor(s) 203 as described herein may be performed post packaging of the sensor 200, and/or even after the part has been placed on a printed circuit board. The smaller acquisition time of the sensor(s) 203 results in lower energy use, which is notably beneficial in situations in which the sensor 200 is powered by a battery such as in applications for data center monitoring or in digital thermometers used for heath monitoring.

In some embodiments, a conventional temperature sensor (e.g., sensor 203) is calibrated against a TD temperature sensor in situ, i.e. following the installation of the conventional temperature sensor and TD temperature sensor combination within a package, on a circuit board, or as part of another device. The DUT, i.e. the package, circuit board, or device, can include a frequency reference, as well as the TD temperature sensor and the conventional temperature sensor. The frequency reference may include a quartz resonant element, a MEMS resonator, a SAW or BAW resonator, or any other appropriate reference. After power is applied, the DUT uses the TD temperature sensor to calibrate the conventional temperature sensor. For example, in a situation in which the TD sensor reports a temperature measurement of 56.2° C. while the conventional sensor reports a temperature measurement of 54.9° C., a table entry can be created indicating that 54.9° C. from the conventional temperature sensor corresponds to 56.2° C. A correction computed from the temperature measurements may be applied over the entire range, for example by adding (56.2-54.9)=1.3° C. to all temperature measurements of the conventional temperature sensor). In some embodiments, a plurality of calibration measurement values taken at different temperatures is used to fit a function, such as a polynomial basis function, to estimate the temperature error and/or correction over an extended range of temperatures based on a finite number of correspondence temperature points; in some embodiments a plurality of calibration measurement values taken at different temperatures are stored in a table to allow interpolation and/or extrapolation of a correction factor to apply to all measurement values obtained from the conventional temperature sensor for points between the calibration values. In some embodiments, correction values are stored in a non-volatile memory for later use. Note that once the correction value(s) have been determined for a particular DUT, the DUT no longer requires use of the TD sensor for the range of temperatures over which the correction value is valid. Thus, subsequent temperature measurements may be made solely with the conventional temperature sensor and corrected using the appropriate correction value. In this way, we obtain improved temperature precision commensurate with the TD sensor, while maintaining the low acquisition time and energy characteristics of the conventional temperature sensor.

In some embodiments, values are discarded and retaken after a period of time to account for aging or drift of the conventional sensor.

Hence, a precision temperature sensor having improved manufacturability can include a first temperature sensor; and a second temperature sensor located on the same substrate as the first temperature sensor, wherein the output of the first temperature sensor is used to perform a calibration of the second temperature sensor. In various examples, the first and second temperature sensors have different operating principles, and/or rely on different device characteristics (such as different temperature-related characteristics, including voltage-to-temperature, current-to-temperature, or diffusivity-to-temperature characteristics, or the like) or characteristics of different types of circuit components (e.g., a temperature-related characteristic of a resistor, a BJT or MOSFET transistor, a piece of silicon, or the like) to provide temperature measurements. In one instance, the first temperature sensor provides measurements (or estimates) of temperature based on thermal diffusivity. In various instances, the calibration is performed at a time of test of the precision temperature sensor, the calibration relies on measurements made using both the first and second sensors at a single temperature point, the calibration relies on measurements made using both the first and second sensors at multiple temperature points, and/or the calibration is performed in situ during regular operation of a system within which the precision temperature sensor is integrated.

The accuracy and performance of temperature sensors that perform measurements based on thermal-diffusivity (TD) can be improved through the fabrication and operation of the sensors. Systems and methods for providing high precision temperature sensors relying on the thermal diffusivity (TD) of silicon as part of a sensing mechanism/process/principle are described in detail below.

Figure 4A:
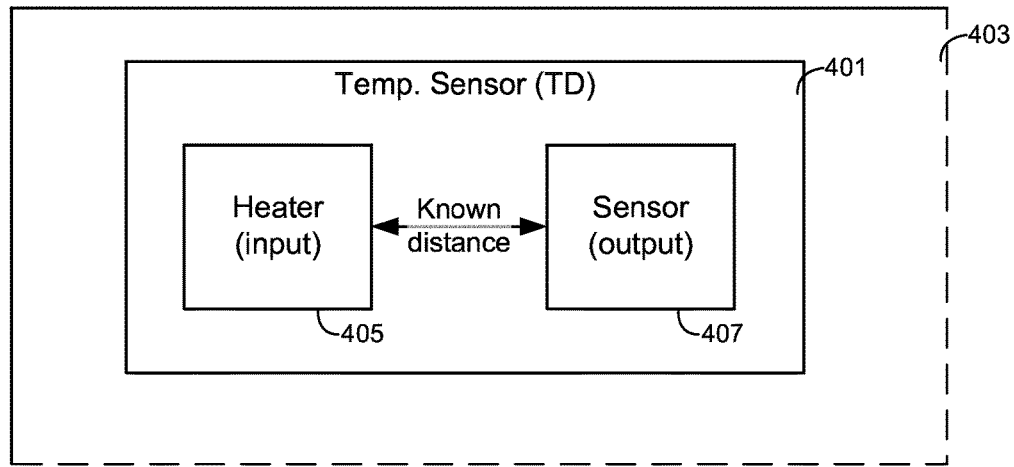
FIGS. 4A-4C are schematic diagrams illustratively showing components of a thermal-diffusivity (TD) based temperature sensor.

FIG. 4A is a schematic diagram showing an illustrative TD-based temperature sensor 401. The TD-based temperature sensor 401 may be fabricated on a substrate 403 such as a silicon (Si) substrate. The TD-based temperature sensor 401 includes a heater 405 and a sensor 407. The heater 405 serves as a sensor input which is activated by a sensor driving signal when a temperature measurement is performed. The sensor 407 serves as a sensor output such that a signal sensed by the sensor 407 is used to determine the temperature of the sensor 401. The temperature of the sensor 401 can be determined based on the signal sensed by the sensor 407, based on the sensor driving signal applied to the heater 405, based on a known or pre-determined distance separating the heater 405 and sensor 407, and based on a known thermal diffusivity of the substrate 403. Alternately, the temperature of the sensor 401 can be determined based on the signal sensed by the sensor 407, based on the sensor driving signal applied to the heater 405, and based upon characterization of how these parameters correlate with temperature over a large number of similar TD-based temperature sensors (e.g. 100 units).

In order to increase the accuracy of the TD-based temperature sensor, the sensor can include a self-aligned sensing element. The sensor 401 includes two elements: the heater 405 input port and the temperature sensor 407 output port. Self-alignment of the pulsed heater 405 with respect to the temperature sensor 407 can be provided by creating both elements using a single masking step during fabrication of the TD-based temperature sensor 401. The use of a single masking step to produce both elements eliminates a large source of manufacturing variation between temperature sensors 401, and thereby results in temperature sensors 401 with consistent characteristics and improved precision. Furthermore, the improved alignment between the heating and sensing elements 405, 407 enables the heater and the sense interface to be disposed closer to each other, so as to thereby reduce measurement time as well as reduce required heater power. For example, if mask misalignment with a conventional sense element causes 100 nm variation in the 10 um nominal distance between the heater and a sensor, and a self-aligned sense element maintains effective distance variation of 10 nm, then the distance between the sense element and heater may be made approximately 10 times closer with a self-aligned sense element than with a conventional sense element. Other factors besides misalignment may set the minimum spacing including the circuit-process geometric design rules, power dissipation budget, or thermal conductivity through parasitic conduction paths such as metal or inter-layer dielectric.

Figure 4B:
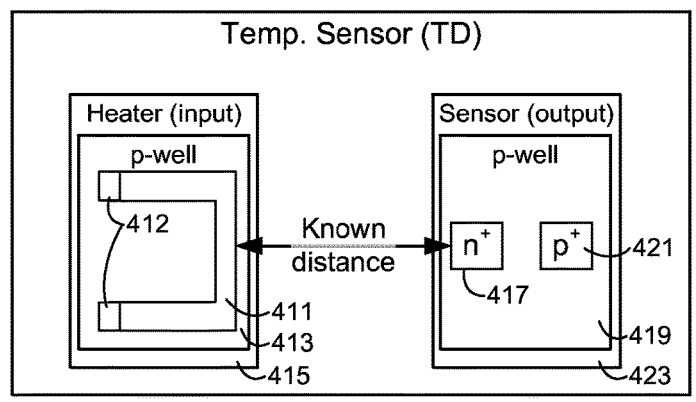
Figure 4C:
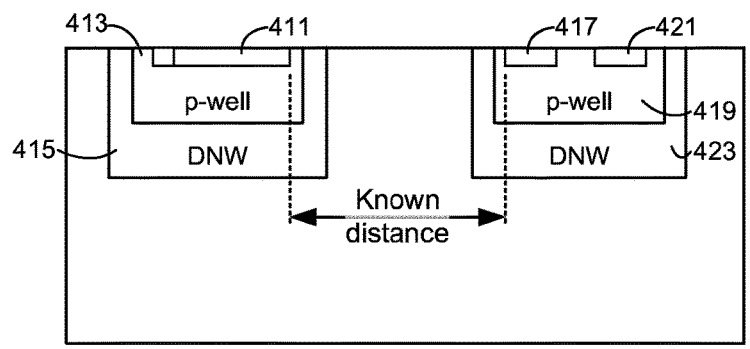

A principal source of variation of temperature sensors comes from misalignment of the heater 405 and the sensor 407 or thermopile array. The present architecture removes this limitation by forming a heater 405 that is self-aligned to the sensor 407 as shown in FIGS. 4A-4C. Self-alignment is provided by patterning a heater element 405 and a sensing element 407 in a manner such that the components forming the heater and sense element are defined by the same, single masking step. With reference to FIG. 4B, in one embodiment the heater 405 is formed of an $n^+$ diffusion 411 (S/D diffusion) located in a p-well 413. The p-well 413 is itself formed over a deep n-well (DNW) that forms part of isolation region 415. The sensor 407 is formed of one or more diodes formed in p-well 419. Each diode is formed of an $n^+$ region 417 formed in p-well 419, and a $p^+$ contact 421 formed in the p-well 419. The p-well 419 is isolated from the substrate by dopant region 423 including a deep n-well (DNW) implant beneath the p-well 419 and an n-well formed to surround the p-well 419.

During fabrication of the temperature sensor 401, the isolation regions 415 and 423 can be firstly created on the surface of the substrate 403 (e.g., a p-type substrate) through the formation of DNWs and of n-wells formed to surround the locations in which p-wells 419 and 413 will be formed. The isolation regions 415 and 423 can be formed in the same process steps. Following formation of the isolation regions, the p-wells 413 and 419 are respectively formed in the isolation regions 415 and 423. The p-wells 413 and 419 can be formed in a same process step. The contact 421 is formed in p-well 419. Finally, the n+ diffusions 411 and 417 of the heater 405 and sensor 407 are formed during a same implant step.

Thus, the heater 411 (e.g., $n^+$ resistor) is defined by a same $n^+$ implant mask that is used to define the location of the $n^+$ region 417 of the diode sensor 407. The distance between the heater 411 and sensor 407 is thus determined by the $n^+$ implant mask. The distance can thus be carefully controlled as it is not a function of alignment between masks used in different fabrication steps. The heater resistance, and the number of contacts to metal at the terminals, may be chosen to make the contact resistance to the $n^+$ implant much less than the total $n^+$ resistance since heat will be generated both inside the diffusion 411 as well as at the contacts 412 used for providing power to the diffusion 411 due to contact resistance. Since the location of the contacts 412 need not be defined by the $n^+$ mask, heat contributed by the contacts 412 will be subject to misalignment issues.

In one example, a 65 nm CMOS process provides an $n^+$ diffusion resistor 411 having a minimum width of 0.36 um, and a sheet resistance of 95 Ohms/Sq. The sensor diode 407 is defined by the base/emitter junction of a vertical NPN formed using a deep isolation region 423 operative to isolate the base 419 from the substrate voltage. The collector of the NPN is tied to ground and PSUB guard rings around the sensing structure may be used (not shown) to provide a low-impedance contact to ground.

Note that in addition to providing base isolation from the substrate, the isolation regions 415 and 423 also provide electrical isolation of the heater 405 from the sensing diodes 407. This isolation is beneficial in isolating from the sensing elements 407 the large currents (e.g., currents having amplitudes of a few mA level, such as currents having amplitudes above 1 mA) flowing in the heater 405. Electrical feedthrough from the heater 405 to the sensing diodes 407 provides an undesired feed-forward path of the electrical signal driving the heater 405 and used to form the heat pulse directly to the sense element 407. The p-well 413 below the heater 405 may have respective substrate contacts to ground to further improve rejection of coupling. A plurality of sensing diodes 407 may be placed around the periphery of the heater 405 in a common-centroid fashion for improved performance.

Self-alignment of the heater 405 to the temperature sensor 407 allows placement of the heater 405 closer to the temperature sensor 407, as the distance does not need to be increased to make alignment variation small in comparison to the total spacing. The decreased spacing provides for a larger change in temperature at the sensor 407 for a same heat input at the heater 405, resulting in an improved signal-to-noise ratio (SNR) as well as allowing the heater 405 to be driven with lower power. Furthermore, the closer spacing provides for operation of the temperature sensor 401 at a higher frequency. However, as the spacing between the heater 405 and sensor 407 is reduced, the relationship between phase delay and temperature becomes more sensitive to the absolute phase measurement because the total phase delay is proportional to the distance between the heater and the sensor (e.g., if the phase/temperature slope is 10 ns/° C. for a 20 um spacing, then the scale factor would be 2 ns/° C. with a 4 um spacing). The sensor 407 can include diodes that are sized to have a nominal temperature coefficient of about 2 mV/° C. for a bias current in the micro-Ampere (uA) range. Since the temperature sensor 407 may need to detect changes in temperature of less than 0.1° C., the sensitivity of the front end may be increased. This may be accomplished by stacking several diodes in series as part of the sensor 407. Looking at FIG. 6, a sensor 407 including ten diodes configured in a differential circuit can yield a scale factor ten times bigger than the scale factor of a sensor 407 including only a single diode, or about 20 mV/T. In various embodiments, a single-ended architecture is used, a pseudo-differential architecture is used (e.g., as described below), a fully-differential architecture is used, or the like as part of the sensor 407. Even though front-end noise power increases linearly with the number of diodes (due to thermal and shot noise), the SNR of the front end increases by the square root of the number of diodes (sqrt(# diodes)) since the signal power increases with the square of the number of diodes in the sensor 407.

The diode voltage is generated by sourcing or sinking a small current through the series connection(s) of diodes using current sources 603a and 603b, as shown. In addition to setting the SNR, the magnitude of the current sourced/sunk by sources 603a, 603b also sets the bandwidth as the small-signal resistance of each diode is a direct function of the forward diode current. In operation, the current sourced/sunk by current sources 603a and 603b flows through each of the diodes. As the temperature of the substrate 403 increases (e.g., in response to a driving signal applied to the heater 405, and/or in response to an increase in the ambient temperature), the voltage across each diode decreases to maintain flow of the fixed current level sourced/sunk by sources 603a, 603b. Thus, as the temperature of the substrate 403 increases, the voltage of node 605a increases while the voltage of node 605b decreases. Conversely, if the temperature of the substrate 403 decreases (e.g., in response to no driving signal being applied to the heater 405 such that the heater cools down to an ambient temperature, and/or in response to a decrease in the ambient temperature), the voltage across each diode increases to maintain flow of the fixed current level sourced/sunk by sources 603a, 603b. Thus, as the temperature decreases, the voltage of node 605a decreases while the voltage of node 605b increases.

In some examples, the stacking of more than one or two diodes in series between upper and lower power supply voltages $V_{DD}$ and Vss (or ground) may require the use of a charge pump to generate a voltage sufficiently high to allow a current source to operate and/or AC coupling to a 1.2V, 65 nm front-end transconductor having a gate oxide that can reliably support the DC voltage generated by the diodes. In some embodiments a technology that supports a higher input voltage, such as 0.25 um CMOS, can be used for the front-end. As described in detail below, due to the single-bit digital feedback and nonlinear quantization of the system architecture, the front-end transconductor need not be particularly linear because the voltage deviations around a set-point of the front-end are small. Thus, a low-noise, high-$g_m$ transconductor front-end may be easily formed without particular attention being paid to transconductor linearity, thereby easing design constraints.

Figure 5:
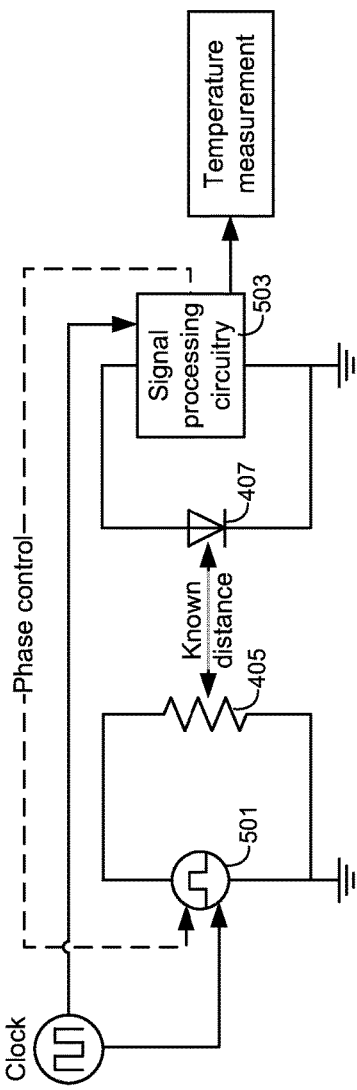
FIG. 5 is a block diagram showing elements of an illustrative temperature sensing system including a TD-based temperature sensor.
Figure 6:
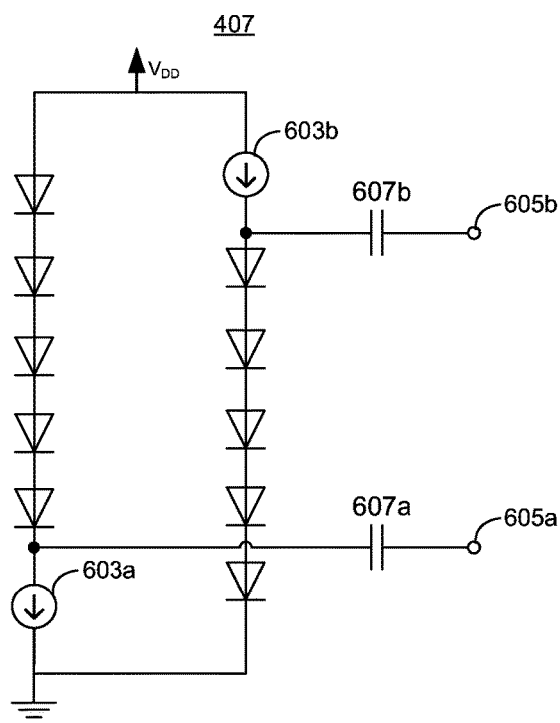
FIG. 6 is a block diagram of an illustrative TD-based temperature sensor.

As shown in FIG. 6, AC coupling to the signal processing circuitry (see FIG. 5, at 503) is easily attained using a metal-insulator-metal capacitor (MIMCAP), a metal-oxide-metal capacitor (MOMCAP), a metal-oxide-semiconductor (MOSCAP), or other capacitor structure able to support the voltage difference from the diode(s) to the front-end. Two capacitors 607a and 607b are connected between the diodes forming the sense element and the signal processing circuitry 503.

The operation of the TD-based temperature sensor will now be described in relation to FIG. 5, which shows an illustrative diagram of control circuitry used to operate the TD-based temperature sensor. As shown in FIG. 5, the TD-based temperature sensor includes the heater 405 and the sensor 407. Additionally, a power source 501 is coupled to the heater 405 and is operative to provide a current or voltage signal for driving the heater 405. For example, the power source 501 may provide a voltage pulse to the heater 405 on a periodic basis (e.g., a periodic basis determined by a clock or oscillator signal received by the power source 501). In response to the periodic voltage pulse, the heater 405 emits heat on a periodic basis. The heat emitted by the heater diffuses through the substrate 403, and is sensed by the sensor 407. The sensor is coupled to signal processing circuitry 503 which is operative to provide the temperature measurement produced by the sensor 401. The signal processing circuitry 503 is additionally operative to control and adjust a phase of the power source 501 (e.g. with respect to the periodic- and invariant-clock or oscillator signal), and to determine the temperature measurement based on the phase applied to the power source 501 through the feedback signal. For example, the signal processing circuitry 503 may determine the temperature based on the adjusted value of the phase, on the known thermal diffusivity of the semiconductor substrate, and on the known distance between the heater and the sensor. In another example the signal processing circuitry 503 may determine the temperature based on the adjusted value of the phase in conjunction with phase-temperature characterization data from a sample of devices.

The amount of phase delay of a heat pulse as it propagates through an IC-grade silicon substrate such as substrate 403 is a function of temperature:

$$\text{phase delay} = -r * \text{sqrt}(w/(2*D(T))),$$

where r is the distance from the heater 405 to the sensor 407, w is the angular frequency of the heater power source 501, and D(T) is the thermal diffusion constant of silicon at a temperature T. In operation, the signal processing circuitry 503 can thus determine the temperature T based on the observed phase delay.

In particular, the signal processing circuitry 503 can include a synchronous demodulator coupled to a thermo-electric-filter (TEF). The synchronous demodulator can operate on the same clock signal received by the power source 501. The signal processing circuit 503 determines a point in the response of the sense-element 407 where the integral of the temperature sensor output is equal for positive and negative cycles of the synchronous demodulation. In addition, digital feedback can be used to adjust the phase of the heater driving signal with respect to a fixed reference frequency driving the sense amplifiers, thereby forming a delta-sigma modulator. Note that the use of chopper stabilization generally simply moves the errors to a higher frequency where they may cause the delta-sigma modulator to overload and increase the noise floor, as the chopped errors are not explicitly removed but rather shifted to a higher frequency of operation in the delta sigma feedback loop.

Figure 7:
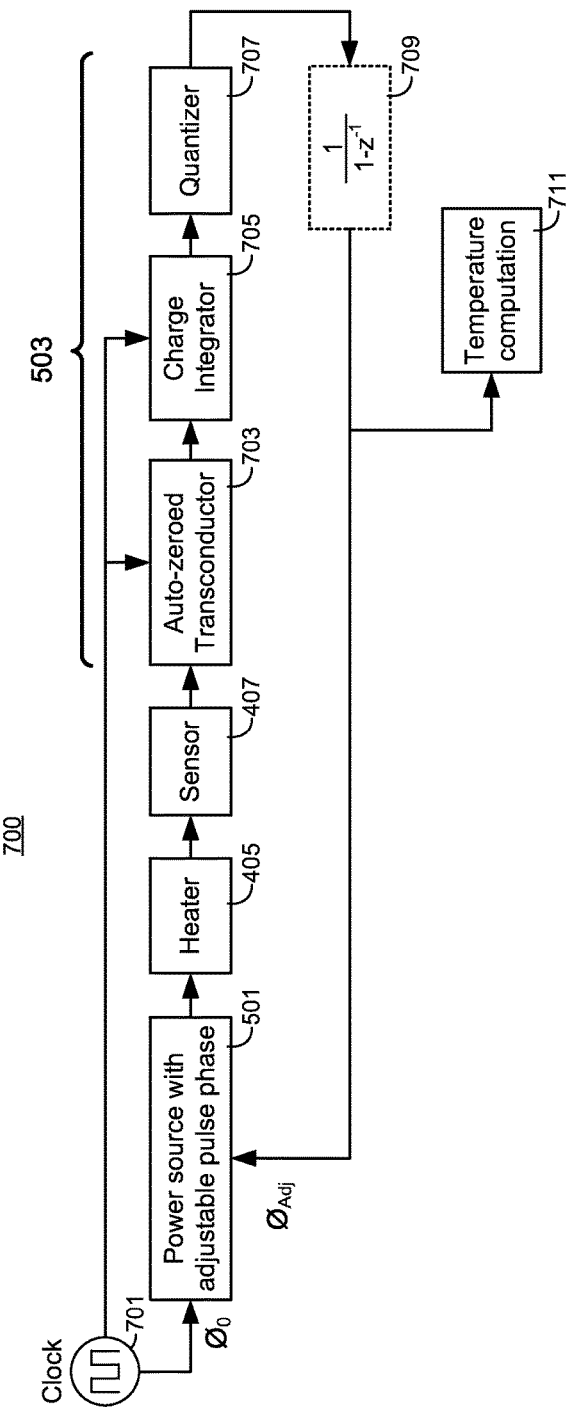
FIG. 7 is an operative flow diagram showing interconnections between elements of a temperature sensing system such as the system of FIG. 5.

FIG. 7 is a block diagram showing illustrative elements forming the signal processing circuitry 503, as well as controlling the heater 405 and sensor 407. As shown in FIG. 7, the signal processing circuitry 503 can include a transconductor 703 (e.g., an auto-zeroed transconductor), a charge integrator 705, a quantizer 707, and an optional loop filter (not shown). In addition, the system 700 includes a clock 701 used to time the operation of the transconductor 703 and of the charge integrator 705, as well as the operation of the power source 501 having an adjustable pulse phase and providing the periodic voltage pulse to the heater 405. The power source 501 is operative to perform phase adjustment based on a phase feedback signal received from the processing circuitry 503. As noted above, the phase control signal produced by the signal processing circuitry 503 is used to determine the temperature measurement 711 of the temperature sensor 401, as well as to control the phase of the power source 501.

Figure 8:
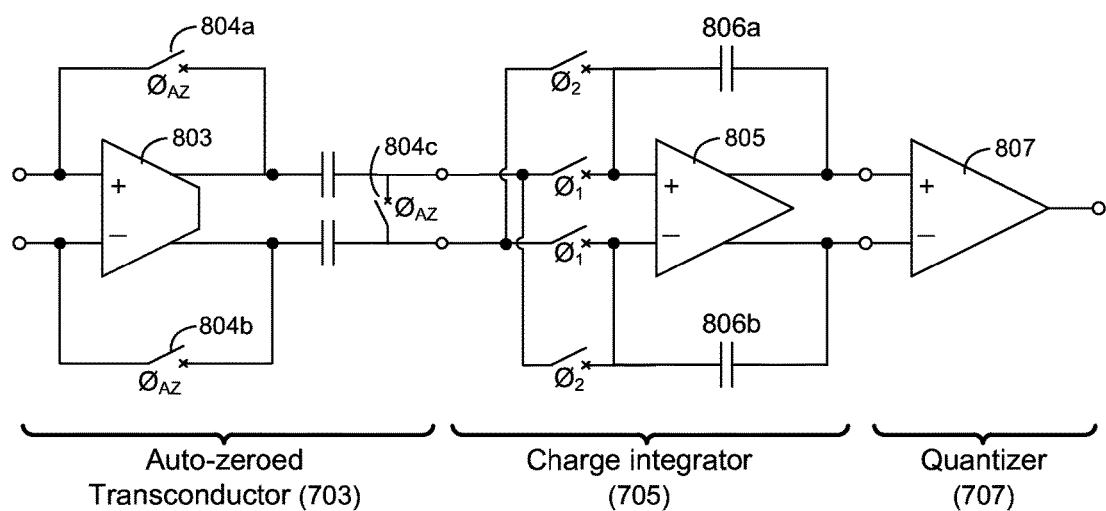
FIG. 8 is a circuit diagram showing illustrative processing circuitry of the system of FIG. 5.

Detailed circuit diagrams of the transconductor 703, charge integrator 705, and quantizer 707 are shown in FIG. 8, while a signal timing diagram is shown in FIG. 9. Operation of the circuitry of FIG. 8 is described in detail in the following paragraphs. Note that while the clock signal Clk is illustratively shown in FIG. 9 as having the same frequency as the various phase signals $\varnothing_{AZ}$, $\varnothing_1$, and $\varnothing_2$, the TD-based temperature sensor may more generally operate using a clock having a frequency that is higher than the frequency at which the sensor and heater are driven. The TD-based temperature sensor may use the higher frequency clock to control the phase of the heater drive signal, for example. The TD-based temperature sensor may further divide the high-frequency clock to obtain the signal Clk shown in FIG. 9. In one embodiment various clock signals of FIG. 9 are derived from a fixed 20 MHz oscillator clock and the phase delay of the heater drive signal is adjusted in quanta of 50 ns (e.g. one 20 MHz oscillator clock pulse) by adjusting a counter value to indicate the start, stop, or duration of the heater drive signal.

Each period of clock 701 begins with an autozero (AZ) phase $\varnothing_{AZ}$, as shown in the signal timing diagram of FIG. 9. At the beginning of the sampling period (AZ phase $\varnothing_{AZ}$), the inputs to the transconductor 803 are put into unity gain feedback by closing the switches 804a-c, effectively shorting the input capacitances 607a and 607b to AC ground. This allows the diodes of sensor 407 (shown in FIG. 6) to settle the voltage on the other side of the capacitors 607a and 607b and sample the voltage before arrival of the thermal-pulse. After the voltages on both sides of the capacitors 607a and 607b have settled, the shorting switches 804a-c are released so as to sample the DC voltage of the bridge, in conjunction with the input-referred transconductor offset and 1/f noise, on the capacitors 607a and 607b. When the sampling operation occurs, kT/C noise is sampled on both AC coupling capacitors 607a and 607b. However, as discussed in more detail below, kT/C noise, offset, and 1/f noise sampled on the front-end is removed due to the correlated-double sampling operation that takes place in the subsequent stage, so it is of minimal consequence. The transconductor 803 in the front-end produces a current signal based on a voltage between the output nodes of the sensing element 407. Following the front-end is a discrete-time charge integrator 705 which produces an integration signal based on the current signal produced by the transconductor 803. Following the integrator 705, a quantizer 707 implemented using a differential comparator in this embodiment produces a quantization signal based on the integration signal produced by the integrator 705. The phase of the periodic driving signal, with respect to the fixed clock 701, produced by the power source 501 is then adjusted based on the quantization signal produced by the quantizer 705. Each of the front-end transconductor 803, charge integrator 705, and comparator 707 may include an operational trans-conductance amplifier (OTA).

After the autozero phase $\varnothing_{AZ}$ is completed, the change in diode temperature from the incident heat pulse results in a time-varying current flow at the output of the transconductor 703 that is integrated by the charge integrator 705 onto capacitors 806a and 806b during phases $\varnothing_1$ and $\varnothing_2$ (see timing diagram of FIG. 9). Note that the transconductor output current includes a desired portion of signal due to temperature, as well as an undesired error-charge portion of signal due to noise and offset sampled during the auto-zero phase. Both desired and undesired signals are integrated onto capacitors 806a and 806b by the charge integrator 705. Charge integration is advantageous over simply sampling the diode voltage because integration filters the wideband noise inherent in the transconductor output without adversely affecting the desired signal magnitude.

During the second integrating phase $\varnothing_2$, the polarity of the charge integrator 705 is switched and charge is removed from the integrator. If the positive ($\varnothing_1$) and negative ($\varnothing_2$) integrating phases are of equal duration, then the same amount of error-charge added to the capacitors 806a and 806b during the positive phase will be subtracted from the capacitors 806a and 806b during the negative phase, thereby removing this source of error in the final output. In some embodiments, the positive and negative integration times (i.e., lengths of $\varnothing_1$ and $\varnothing_2$) are made of unequal duration.

Figure 10A:
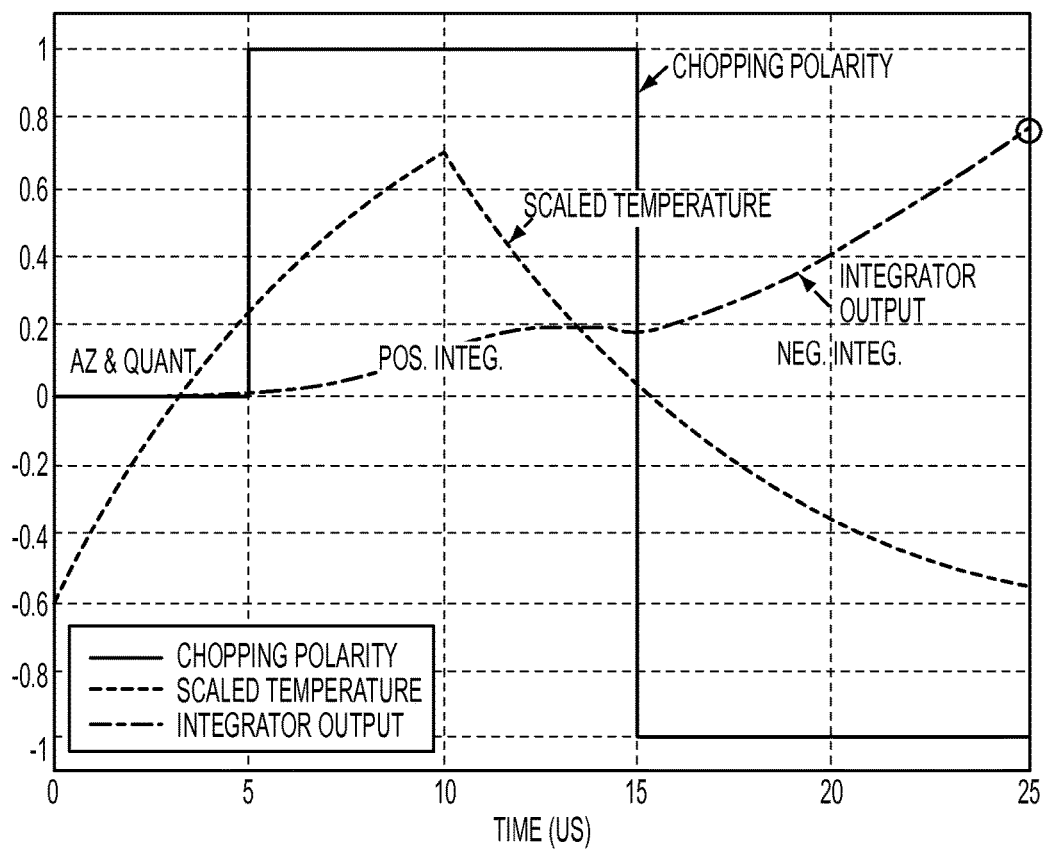
FIGS. 10A-10D are plots showing responses of a temperature sensing system such as the system of FIG. 5 under different operating conditions.
Figure 10B:
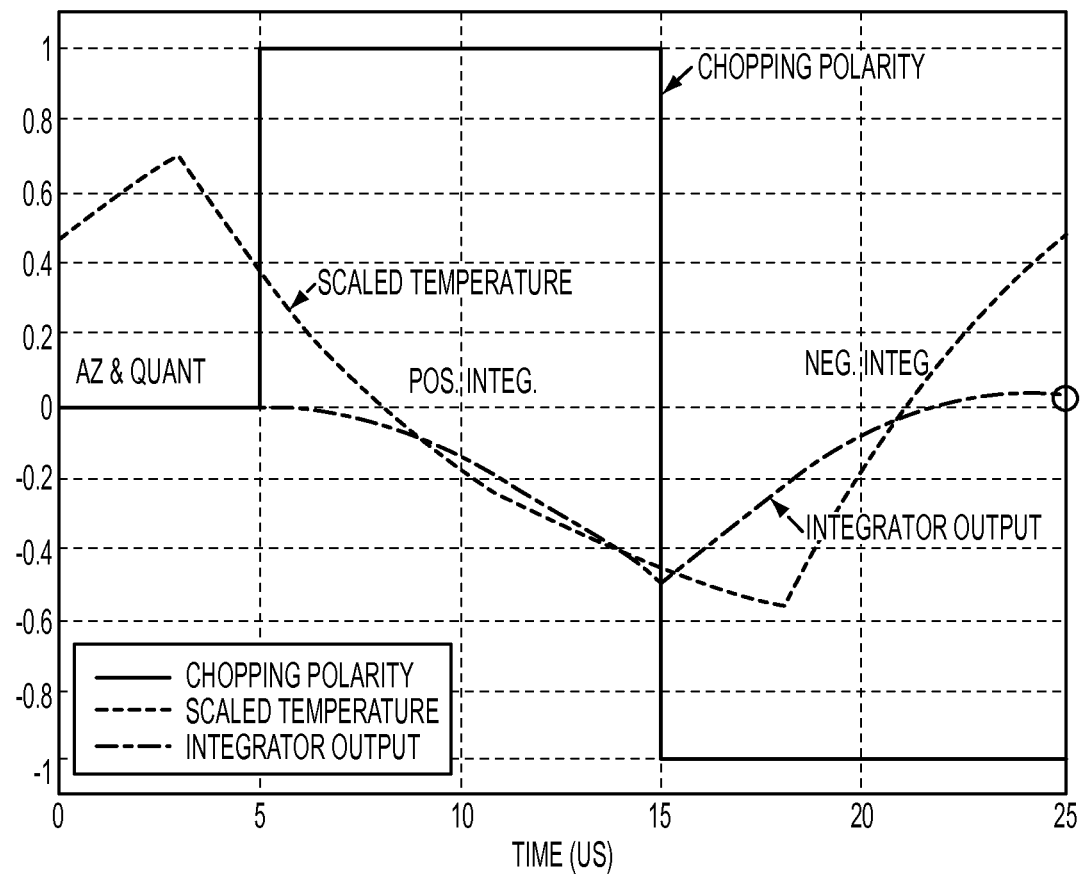
Figure 10C:
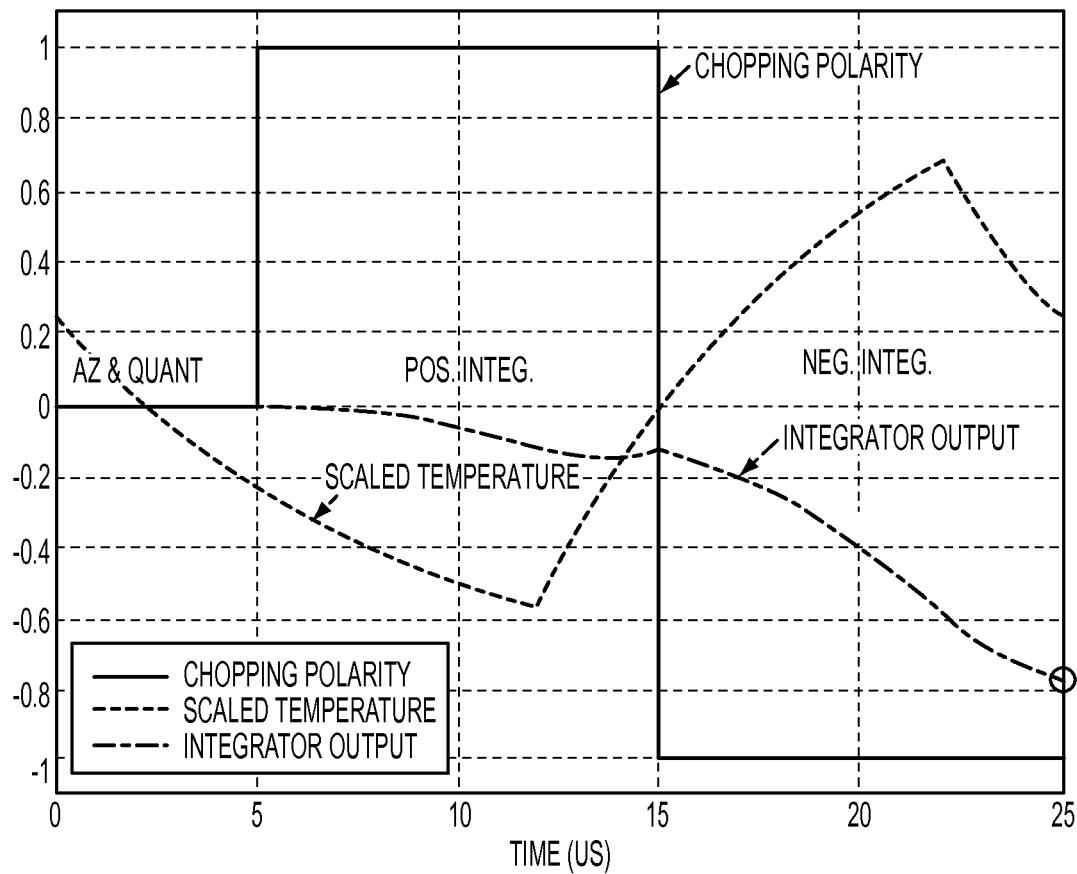

FIGS. 10A-10C show simulations of the temperature, integrator polarity, and integrator output as the relative phase between the heater and the fixed reference varies assuming a first-order model of the sensor element 407. In the examples of FIGS. 10A-10C, the clock period is set to 25 us, with the AZ phase $\varnothing_{AZ}$ lasting for the first 5 us of the period, and each of the integrating phases $\varnothing_1$ and $\varnothing_2$ lasting 10 us (and respectively corresponding to the intervals 5-15 us and 15-25 us of each clock period).

In FIG. 10A, the heater phase occurs too late in the clock period (i.e., the phase delay controlling the power source is too large), and results in the above threshold (e.g., above zero) single-cycle integrator output (shown as the circle at the end of the "integrator output" plot which is above zero at time point 25 us). In FIG. 10B, the heater phase is approximately correct, as evidenced by the approximately at-threshold (e.g., approximately zero) integrator output at time 25 us. In FIG. 10C, the heater phase is too early in the clock period (i.e., the phase delay controlling the power source is too small), and results in the below-threshold (e.g., below zero) "integrator output" at time 25 us. Front-end offset is removed by correlated double-sampling in a manner similar to the DC level due to ambient temperature, leaving only the desired transient signal. Note, however, that charge-integrator offset errors may not be completely removed. However, due to where integrator offset errors enter the feedback loop (as explained below in the relation to a System Architecture description) they generally are of no consequence.

Figure 10D:
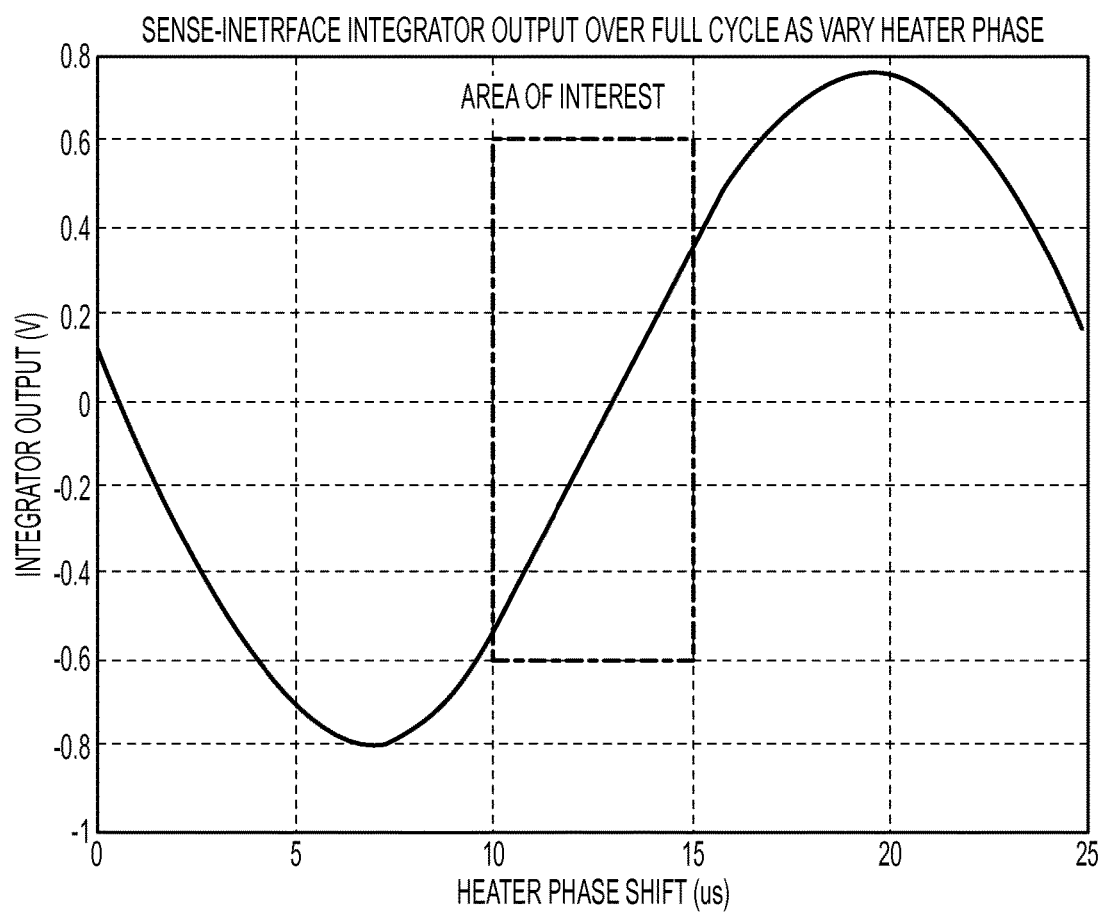

FIG. 10D illustrates the change in integrator voltage for a single cycle as the relative phase of the heater driving pulse to the fixed reference clock frequency (and hence integrator clocking values) varies. As can be seen in FIG. 10D, if the phase is too small (i.e., less than ~13 us in the figure), the integrator output is negative; and if the phase is too large (i.e., more than ~13 us in the figure), the integrator output is positive. Note that the shape of the curve is not monotonic, however monotonicity is not required since the polarity of the integration is correct unless operation extends beyond a full cycle of phase. In general, operation of the feedback loop occurs in the region marked "Area of Interest" although transients (e.g. during startup) may cause the relative phase of the heater pulse to the fixed frequency to extend beyond this region for a period of time.

Figure 11:
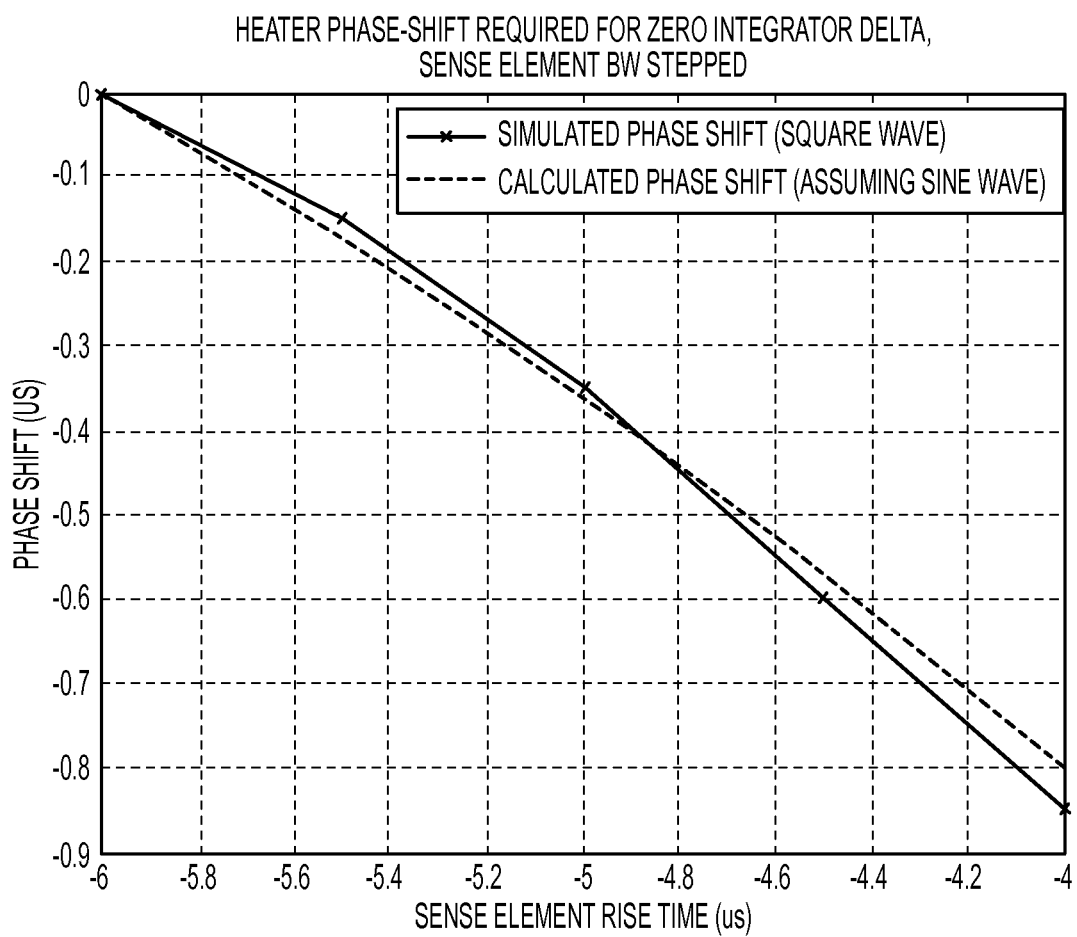
FIGS. 11, 13, and 14 are plots showing performance metrics of a temperature sensing system such as the system of FIG. 5 under different simulation conditions.

FIG. 11 shows the change in the average phase of the heater input (with respect to the fixed clock) to attain zero net charge (corresponding to the zero integrator output of FIG. 10D) as the frequency response of the TD-sense element is adjusted to simulate the effect of a change in the thermal diffusivity of silicon. As can be seen in FIG. 11, the simulated value of phase that balances the positive and negative integration cycles tracks well the expected phase shift based upon a first order model. While the dynamics of the sense element are more complicated than a simple first-order model, this simulation shows that balancing the integral of temperature provides a good metric of phase shift. In one particular example, the phase shift of the thermal response of the heater pulses at the diode is approximately 0.2 degrees 1° C.; in the particular example, this corresponds to a phase shift/temperature shift scale factor of about 12 ns 1° C. for the particular geometries of the example.

In one example, in order to get a rough idea of the sense-interface sensitivity we can assume a 0.1° C. (exponential response final value) rise in temperature at the sensing diodes, which corresponds to a heater pulse of about 5 mW at a distance of 20 um. With 10 diodes in series, each having a temperature coefficient of 2 mV/T, we arrive at a desired signal magnitude of 2 mV at the sensing diodes. For a 2 uA bias, the noise of the diodes is approximately sqrt(10)*30 nV/rtHz=95 nV/rtHz. The noise is integrated over both integration periods. Thus the noise integrated over a 10 us+10 us period is approximately equal to the noise with first-order shaping integrated from 0 Hz, or about 15 micro-volts RMS, input referred. We may refer the noise to an equivalent input-referred phase shift; this is helpful to determine the effect of noise on the quantity of interest: phase shift. In combination with FIG. 10D, a change of 1 us phase at the most sensitive portion of the transfer curve (where we will generally operate) results in an integrator output change of about 10% of full scale (for a square wave input) or about 0.2 mV, input referred. Thus a single integrator period measurement yields a thermal noise equal to about 1 us*(0.015/0.2)=75 ns RMS. To attain a resolution of 1 ns (equivalent to 0.1° C. at a spacing of about 20 um), 5000 samples should be accumulated, or about 100 ms. If the temperature rise was doubled to 0.2° C. (e.g. by increasing the energy dissipated in the heater or moving the heater and sensing diodes closer together), then only about 25 ms of data needs to be acquired.

More diodes may be stacked in the sensor (e.g., as shown in FIG. 6) than will generally fit within the nominal rails by using a DC-DC converter (e.g., a Dickson charge pump) to generate a voltage $V_{DD}$ that is higher than a supply voltage provided to the temperature sensor. The charge pump may be formed using core MOS devices (e.g., 1.2V devices in a 65 nm technology, 1.8V devices in a 0.18 um technology) with a Dickson architecture with the wells floated as they are able to hold off the excess voltage above 1.2V. In some embodiments, PN-junction diodes or BJTs are used to make a charge pump. In general, the performance of the charge pump will benefit from zero bulk-to-source voltage $V_{BS}$ because the threshold voltage of the MOS diodes in the charge pump will remain low. Because the amount of current needed to bias the diodes is small (on the order of 1-2 microamps), the charge pump may be integrated on chip in a small area. The supply ripple will be somewhat rejected by the diode stack connected to ground; however the ripple will directly couple in from the diode stack connected to the high side. Note that if the charge pump is run at a rate substantially greater than the heater operating frequency, and the charge pump frequency is chosen such that an equal and integral number of charge pump cycles occur within each integrator period (positive/negative), then the integration operation will act as a sinc filter effectively removing the ripple from the output at the end of the cycle.

Note that the heater drive pulse may undesirably couple into the sensitive front-end. To remove these coupling effects, the power applied to the heater may be alternately chopped such that pulses applied in successive clock periods have alternating polarities. With reference to FIG. 12, in a first integration period, the heater is heated by applying a positive voltage pulse $V_{heat}$. In a subsequent heater cycle, the polarity is switched and a voltage pulse of $-V_{heat}$ is applied to the heater. Modulating the polarity of the heater power source helps to cancel via averaging feed-through from capacitive and other feed-through sources coupling into the front end.

To digitally convert the analog temperature to a digital quantity, a phase-digitizing ADC may be built using the front-end described above. To attain resolution on the order of <1 ns (less than 1 ns) without requiring a reference voltage, as well as ensuring that the output is independent of the magnitude of the temperature rise, a delta-sigma phase-digitizing architecture can be used, such as the architecture shown in FIGS. 7 and 8. The feedback-loop as drawn includes a delta-sigma (DS, alternately sigma-delta) modulator: the input to the modulator is $\emptyset_0$ which is the phase of the clock signal. The feedback loop produces a phase adjustment value $\emptyset_{Adj}$ that is used by the power source 501 to adjust the phase of the heater driving signal with respect to the fixed clock 701 (e.g., the timing of the heater driving pulse).

The charge quanta output by the front end transconductor 703 is integrated as described earlier; when the integrator 705 is not cleared between samples, the integration provides noise shaping for the DS modulator. The output of the integrator 705 is quantized by a comparator 707, and the output is used to adjust the feedback phase $\emptyset_{Adj}$ of the heater 501 with respect to the fixed reference clock 701 to drive the average of the charge quanta output by the front-end towards zero. Note that the output of the comparator 707 is a single bit quantity that represents whether the phase of the heater should be advanced or retarded to drive the integral of the charge quanta towards zero. The effect of any offsets introduced after the transconductor (e.g., integrator 705, comparator 707, etc.) will be driven towards zero due to the integrating action after the transconductor.

In some embodiments, the quantizer output is used to adjust the heater phase with respect to the fixed clock by adding or subtracting a quanta from a counter that is used to time the application of the heater pulse with respect to the fixed clock: adding a quanta causes phase delay next cycle and subtracting a quanta causes a phase advance next cycle. In this architecture, additional dynamics including an additional integrator (e.g., at 709) in the feedback path occurs since the addition of a time quanta to the heater phase is reflected in the phase of the heater to the pos/neg sampling edge for all subsequent cycles. An advantage of this architecture is that the digital output will converge to the proper value without having to place the initial feedback phase at a particular point. In some embodiments, the quantization level is increased for larger capture range or more rapid initial settling during an initial phase, and reduced to a second value during a second phase for improved resolution. In some embodiments, a digital compensator, not shown, (e.g., a FIR filter having the form $a-z^{-1}$ where a is a number >1) may be added after the quantizer 707 and be used to add phase thereby stabilizing the feedback loop. In some embodiments, an analog compensator is used. In some embodiments, the phase is set close to the expected phase and phase is directly modulated about this phase (as opposed to having an integrator 709 in the feedback path) thereby removing additional dynamics from the feedback path.

With reference to FIG. 7, a TD-based sensor having a single integrator 705 in the forward path integrates charge pulses from the front-end, quantizes the output of the integrator, optionally compensates the phase adjustment (not shown), and then applies the phase adjustment of the compensator to the heater drive. The characteristic equation of the loop is second order without the compensator. Note that the sense-element also causes phase delay between the feedback signal and the output since the excitation frequency is generally chosen near 45 degrees phase lag for optimal sensitivity. Thus, the dynamics of this filter (e.g. the response from previous periods) will also contribute to the loop phase in the delta sigma converter.

Figure 13:
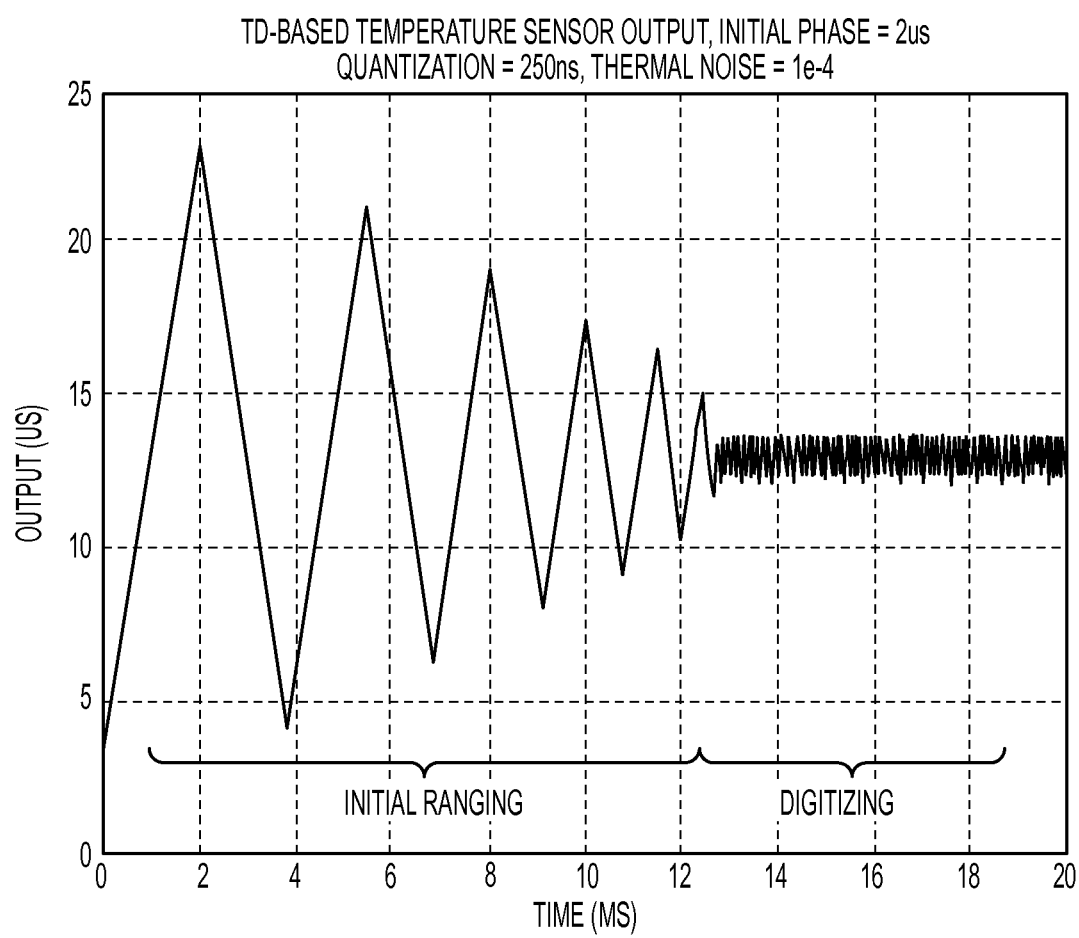
Figure 14:
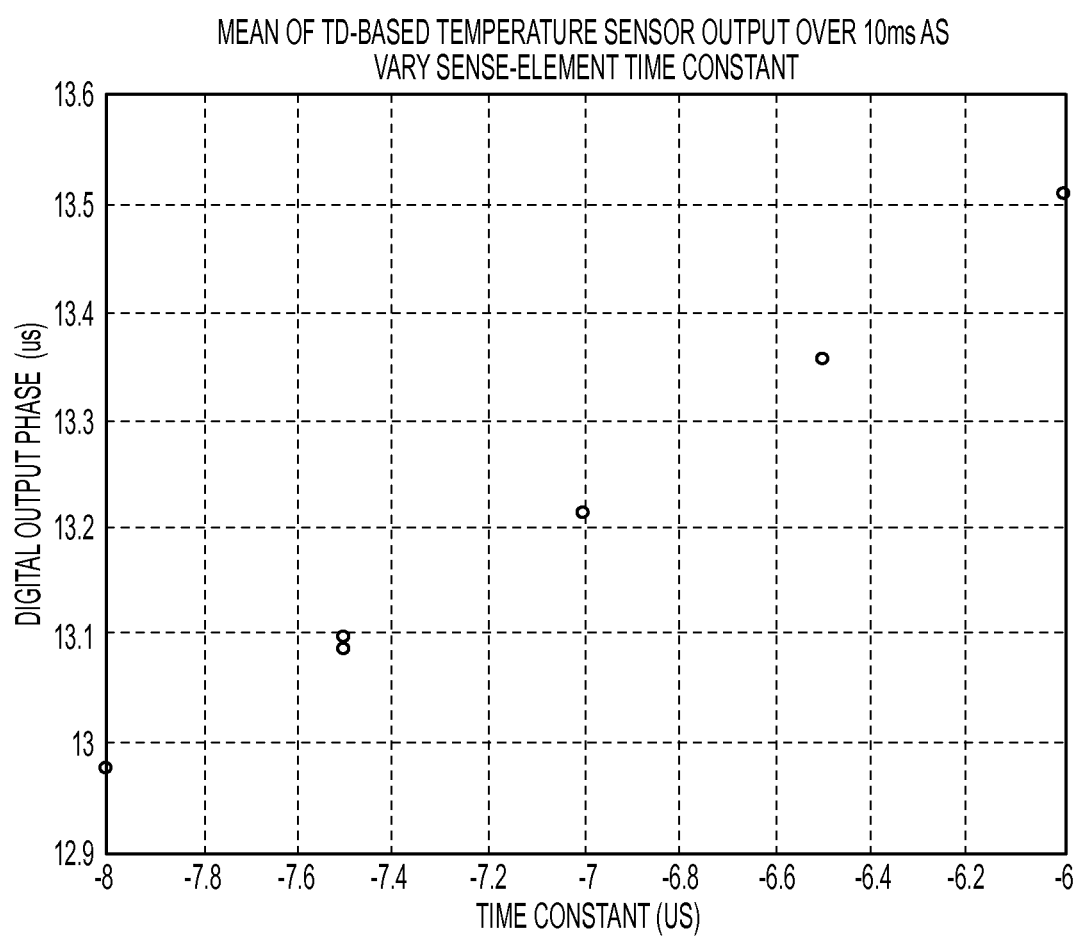

FIG. 13 illustrates a simulation of the digital output as taken from the node labeled $\emptyset_{Adj}$ including initial settling of the feedback phase with respect to the fixed clock. For this simulation, the TD-dynamics were modeled as a first-order system with a time constant of 8 us, the heater-phase quantization step size was 250 ns and the initial phase was set at 3 us. FIG. 14 shows the mean digital output over 10 ms (after initial settling) for five simulations at each value of TD time-constant dynamics as the time constant is varied from 8 us to 6 us.

The sense interface detects whether the phase is greater or less than the point at which the integral of the temperature response during the first half-cycle equals the integral of the temperature response during the second half-cycle. Phase errors can enter into the system two ways: at the heater or at the sensing element and subsequent circuits.

In some examples, the sense element 407 may be constructed to measure the difference between two sensors spaced different distances from the heater. By measuring the difference in the temperature response the effect of heater-pulse shape and delay is taken out of the equation.

The phase offset of the sense interface can be tested by injecting a small differential test current into the sensing diodes at one or more known and fixed times with respect to the fixed clock. The difference in the output from the expected value is the sense interface offset. In such a test, a small current may be injected into the diode stack to emulate the effect of the heat.

A heater (e.g., 215) may be included on the substrate 403 for testing scale factor. The heater can draw approximately 100 mW, and can be placed close to the TD sensor (approximately 10 um away, or inside or surrounding the sensor). A tester forces a constant power, or alternately the current and voltage can be measured and the applied power calculated. For a given applied power, the sensor may exhibit a consistent rise in temperature at the sense element (or in a predictable way based on the measured current and voltage).

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, inventive subject matter lies in less than all features of a single disclosed embodiment.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for calibrating a first temperature sensor disposed on a substrate, the method comprising:
providing a second temperature sensor on the substrate having the first temperature sensor disposed thereon, wherein the second temperature sensor is operative to perform temperature measurements based on thermal diffusivity (TD);
obtaining a first temperature measurement using the first temperature sensor, wherein the first temperature sensor is operative to perform temperature measurements based on characteristics of a semiconductor junction, a bipolar transistor, or a MOSFET transistor;
substantially concurrently with the obtaining of the first temperature measurement, applying a reference frequency signal to the second temperature sensor and obtaining a second temperature measurement using the second temperature sensor;
computing, based on the first and second temperature measurements, a calibration adjustment value for the first temperature sensor operating based on the characteristics of a semiconductor junction, a bipolar transistor, or a MOSFET transistor; and
adjusting, based on the computed calibration adjustment value, a third temperature measurement from the first temperature sensor operating based on the characteristics of a semiconductor junction, a bipolar transistor, or a MOSFET transistor.

2. The method of claim 1, further comprising:
applying heat or cold to the substrate, and obtaining a fourth temperature measurement using the first temperature sensor during or following the applying of the heat or cold; and
substantially concurrently with the obtaining of the fourth temperature measurement, applying the reference frequency signal to the second temperature sensor and obtaining a fifth temperature measurement using the second temperature sensor,
wherein the calibration adjustment value for the first temperature sensor is computed based on the first, second, fourth, and fifth temperature measurements.

3. The method of claim 2, wherein the applying of the heat or cold to the substrate comprises providing power to a heater disposed on the substrate having the first and second temperature sensors disposed thereon.

4. The method of claim 1, further comprising storing the computed calibration adjustment value in a non-volatile memory disposed on the substrate.

5. The method of claim 4, wherein the storing of the computed calibration adjustment value comprises trimming a circuit element of the first temperature sensor disposed on the substrate to adjust an electrical parameter of the circuit element.

6. The method of claim 1, further comprising:
monitoring the reference frequency signal applied to the second temperature sensor to obtain a reference frequency signal correction value,
wherein the calibration adjustment value for the first temperature sensor is computed based on the first and second temperature measurements and the obtained reference frequency signal correction value.

7. The method of claim 1, wherein the applying the reference frequency signal to the second temperature sensor comprises activating an oscillator disposed on the substrate.

8. The method of claim 1, wherein the applying the reference frequency signal to the second temperature sensor comprises receiving the reference frequency signal from an oscillator external to the substrate.

9. The method of claim 1, further comprising:
providing a third temperature sensor on the substrate having the first and second temperature sensor disposed thereon, wherein the third temperature sensor is operative to perform temperature measurements based on thermal diffusivity (TD); and
substantially concurrently with the obtaining of the first and second temperature measurements, applying a reference frequency signal to the third temperature sensor and obtaining a fourth temperature measurement using the third temperature sensor,
wherein the computing the calibration adjustment value for the first temperature sensor comprises computing the calibration adjustment value based on the first, second, and fourth temperature measurements.

10. The method of claim 1, further comprising:
providing a heater disposed on the semiconductor substrate;
driving the heater with a periodic signal to cause the heater to emit heat through the semiconductor substrate;

sensing heat emitted by the heater through the semiconductor substrate using the second temperature sensor;

adjusting a phase of the periodic signal driving the heater based on heat sensed by the second temperature sensor; and determining the temperature based on an adjusted value of the phase applied to the periodic signal driving the heater.

11. The method of claim 10, wherein the determining the temperature comprises determining the temperature based on the adjusted value of the phase applied to the periodic signal driving the heater, a thermal diffusivity of the semiconductor substrate, and a known distance between the heater and the second temperature sensor.

12. The method of claim 10, wherein the sensing heat emitted by the heater comprises:

applying a current to a series interconnection of diodes; and sensing a change in voltage across the series interconnection of diodes resulting from the heat emitted by the heater through the semiconductor substrate.

13. The method of claim 12, wherein the adjusting the phase of the periodic signal comprises:

producing a current signal based on the change in voltage across the series interconnection of diodes;

integrating the current signal over a period of time;

quantizing the integrated current signal; and selectively increasing or decreasing the phase of the periodic signal driving the heater based on the quantized integrated current signal.

14. The method of claim 10, wherein the driving the heater with a periodic signal comprises driving the heater with a signal that alternates polarity in successive periods of the signal.

15. The method of claim 1, wherein the first and second temperature sensors perform temperature measurements based on different operating principles.

* * * * *